(12) United States Patent
Ohsawa et al.

(10) Patent No.: US 6,873,339 B2
(45) Date of Patent: *Mar. 29, 2005

(54) COLOR REPRODUCTION SYSTEM FOR MAKING COLOR DISPLAY OF FOUR OR MORE PRIMARY COLORS BASED ON INPUT TRISTIMULUS VALUES

(75) Inventors: Kenro Ohsawa, Musashino (JP); Nagaaki Ohyama, Kawasaki (JP); Masahiro Yamaguchi, Yokohama (JP); Takeyuki Ajito, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/465,693

(22) Filed: Jun. 19, 2003

(65) Prior Publication Data

US 2003/0214499 A1 Nov. 20, 2003

Related U.S. Application Data

(62) Division of application No. 09/577,923, filed on May 24, 2000, now Pat. No. 6,633,302.

(30) Foreign Application Priority Data

May 26, 1999 (JP) ............................................ 11-146520

(51) Int. Cl.[7] ............................ G06T 15/00; G09G 5/02
(52) U.S. Cl. ........................ 345/604; 345/419; 345/590; 345/591; 345/600
(58) Field of Search ............................. 345/22, 87, 204, 345/419, 590, 591, 600, 690, 604, 7, 73; 348/744, 742, 650, 42

(56) References Cited

U.S. PATENT DOCUMENTS 3,631,461 A  * 12/1971 Powell et al. ................. 345/73
5,534,949 A  *  7/1996 Baron ......................... 348/742
5,838,389 A  * 11/1998 Mical et al. ................. 348/650
6,191,826 B1 *  2/2001 Murakami et al. ........... 348/744
6,225,974 B1 *  5/2001 Marsden et al. ............. 345/590

(Continued)

FOREIGN PATENT DOCUMENTS

JP        6-261332          9/1994

OTHER PUBLICATIONS

Printouts of the NHK home page introducing the material used in an open house exhibition of the NHK Science & Technical Research Laboratories (Downloaded and reproduced on May 24, 2002 from the website of NHK, a Japanese government–assisted broadcasting and TV organization, http://www.nhk.or.jp/strl/open95/index–e.html).

Printouts of the NHK home page introducing the material used in an open house exhibition of the NHK Science & Technical Research Laboratories (Downloaded and reproduced on May 24, 2002 from the website of NHK, a Japanese government–assisted broadcasting and TV organization, http://www.nhk.or.jp/strl/open95/ex/k05index.html).

Joji Tajima, "The Theory of Color Image Reproduction" (in Japanese), Sep. 30, 1996 (Japan), pp. 33–39.

*Primary Examiner*—Bipin Shalwala
*Assistant Examiner*—David L. Lewis
(74) *Attorney, Agent, or Firm*—Frishauf, Holtz, Goodman & Chick, P.C.

(57) ABSTRACT

A color reproduction system includes a color image display unit capable of displaying a color image of four or more primary colors, and a color converting unit for converting input three-primary color signals into color image signals of respective primary colors of the color image display unit. The color converting unit includes an area deciding section that decides a color conversion area to which the input three-primary color signals belong in a three-dimensional color space, and a color image signal calculating section that converts the input three primary color signals into color image signals of respective primary colors based on color conversion parameters corresponding to a color conversion area decided by the area deciding section.

15 Claims, 8 Drawing Sheets

COLOR REPRODUCTION AREA OF A FOUR-PRIMARY COLOR DISPLAY

U.S. PATENT DOCUMENTS 6,262,744 B1 * 7/2001 Carrein .................... 345/604
6,309,072 B1 * 10/2001 Deter ....................... 353/31
6,340,975 B2 * 1/2002 Marsden et al. ............ 345/590
6,340,976 B1 * 1/2002 Oguchi et al. ............. 345/690
6,377,230 B1   4/2002 Yamazaki et al.
6,538,742 B1 * 3/2003 Ohsawa .................... 356/405
6,571,010 B1 * 5/2003 Inoue ....................... 382/162
2002/0105483 A1 * 8/2002 Yamazaki et al. ........... 345/7
2003/0137610 A1 * 7/2003 Ohsawa .................... 348/744

* cited by examiner

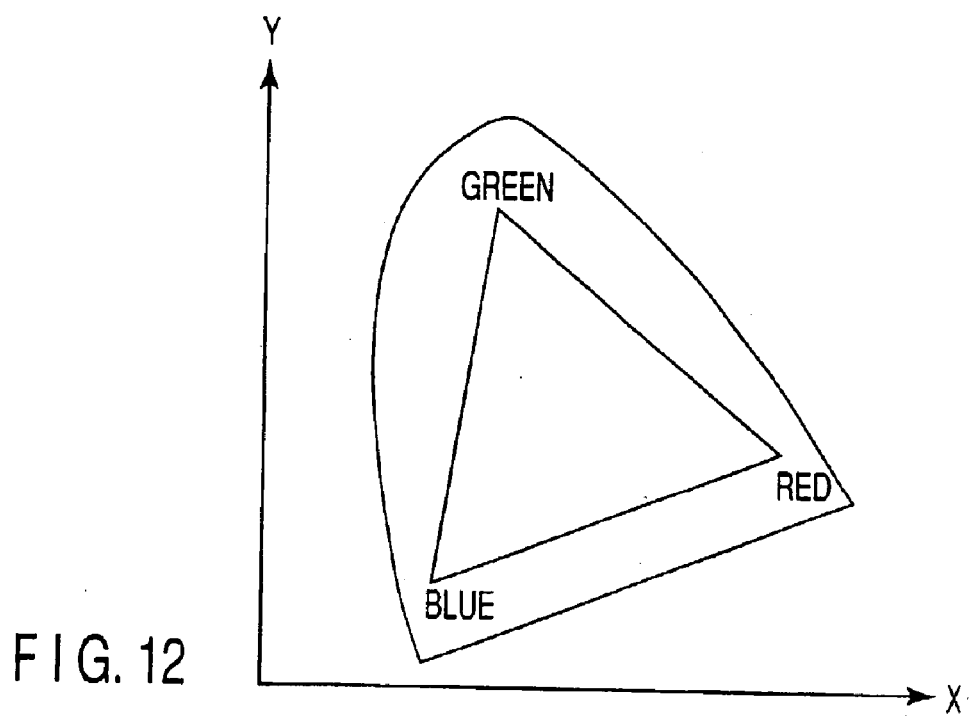
F I G. 12
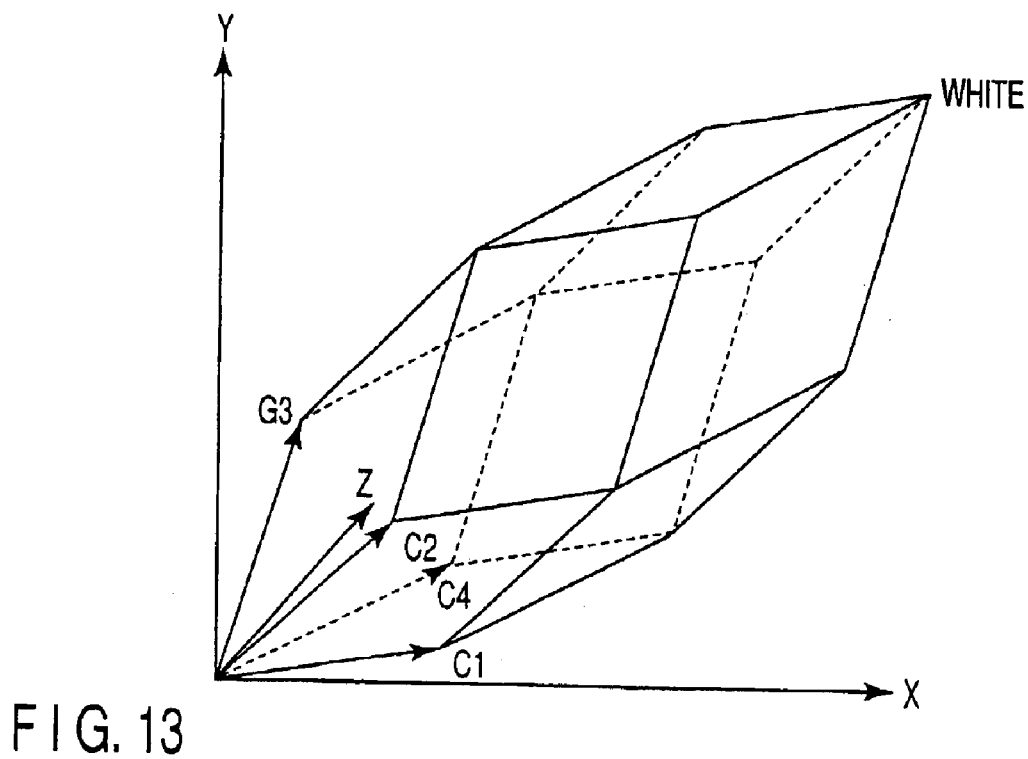
F I G. 13

COLOR REPRODUCTION SYSTEM FOR MAKING COLOR DISPLAY OF FOUR OR MORE PRIMARY COLORS BASED ON INPUT TRISTIMULUS VALUES

CROSS-REFERENCE TO RELATED APPLICATIONS

This application is a division of application Ser. No. 09/577,923 filed May 24, 2000, now U.S. Pat. No. 6,633,302 which is based upon and claims the benefit of priority from the prior Japanese Patent Application No. 11-146520 filed May 26, 1999, the entire contents of which are incorporated herein by reference.

BACKGROUND OF THE INVENTION

The present invention relates to a color reproduction system, and relates, more particularly, to a color reproduction system for obtaining an input color image signal for displaying desired colors in a color image display unit capable of displaying a color image of at least four primary colors.

There have been widely used various display units such as CRT displays, liquid crystal displays, liquid crystal projectors, etc. as a means for reproducing digital color images that have been input by scanners, digital cameras, and the like. Usually, these display units reproduce various colors based on an additive color mixture of three primary colors, R, G, and B. In this case, a range of display colors that a display can reproduce, that is, a color reproduction area, is limited to an area that can be displayed as a sum of color vectors of three primary colors in a three-dimensional color space. For example, a CRT display for reproducing colors by three kinds of phosphors R, G and B has a hexahedron as a color reproduction area that has the following vertexes: (0, 0, 0), (Xr, Yr, Zr), (Xg, Yg, Zg), (Xb, Yb, Zb), (Xr+Xg, Yr+Yg, Zr+Zg), (Xg+Xb, Yg+Yb, Zg+Zb), (Xb+Xr, Yb+Yr, Zb+Zr), and (Xr+Xg+Xb, Yr+Yg+Yb, Zr+Zg+Zb). In this case, (Xr, Yr, Zr), (Xg, Yg, Zg) and (Xb, Yb, Zb) represent color displays X, Y and Z respectively of the CIE1931 color display system (XYZ color display system) at the time of a maximum light emission of the R, G and B phosphors.

FIG. 11 is a schematic diagram of a color reproduction area in the XYZ space of the three-primary color display. FIG. 12 is an xy-chromaticity diagram of this schematic diagram. As shown in FIG. 12, the area inside a triangle encircled by chromaticity values of the primary colors is a color reproduction area. In the display that is based on the additive color mixture of three primary colors as the principle of color reproduction, a relationship between the R, G and B signal colors that are input to the display and X, Y and Z values of colors that are displayed on the display is determined uniquely. When the light emission spectrum of each primary color is independent of an output of other primary color, and also when a relative spectrum distribution does not depend on the light emission intensity (that is, when the chromaticity value does not change), X, Y and Z of display colors corresponding to the input R, G and B values are given by the following expression.

$$\begin{pmatrix} X \\ Y \\ Z \end{pmatrix} = \begin{pmatrix} Xr & Xg & Xb \\ Yr & Yg & Yb \\ Zr & Zg & Zb \end{pmatrix} \begin{pmatrix} R' \\ G' \\ B' \end{pmatrix} \quad (1)$$

$R' = \gamma_r(R)$ $G' = \gamma_g(G)$ $B' = \gamma_b(B)$

In this case, Xr, Xg and Xb are X values at the time of a maximum light emission of R, G and B. Similarly, Yr, Yg and Yb are Y values when the light emissions of R, G and B are maximum, and Zr, Zg and Zb are Z values when the light emissions of R, G and B are maximum. Further, γr, γg and γb are functions that show a relationship between an input signal value and an output luminance of R, G and B respectively. R', G' and B' are assumed to be normalized to become 1 at the time of a maximum light emission of R, G and B respectively. From an inverse relationship of the above, input R, G and B values for displaying desired X, Y and Z are obtained from the following expression.

$R = \gamma_r^{-1}(R')$ $G = \gamma_g^{-1}(G')$ $B = \gamma_b^{-1}(B')$ $$\begin{pmatrix} R' \\ G' \\ B' \end{pmatrix} = \begin{pmatrix} Xr & Xg & Xb \\ Yr & Yg & Yb \\ Zr & Zg & Zb \end{pmatrix}^{-1} \begin{pmatrix} X \\ Y \\ Z \end{pmatrix} \quad (2)$$

In the Expression (2), −1 shows an inverse function (an inverse matrix in the case of a matrix). As explained above, it is easy to model a relationship between X, Y, Z and the R, G, B values in the case of the three-primary color display. There has been generally used a conversion method that is based on a matrix conversion and a gradation correction as disclosed in "The Theory of Color Image Reproduction (in Japanese)", Joji Tajima, Maruzen Co., Ltd. When X, Y and Z are in the area outside the color reproduction area of the three-primary color display, any one of the R', G' and B' values obtained in the Expression (2) becomes negative or larger than 1.

According to the display unit that is based on the additive color mixture of primary colors as the principle of color reproduction, the area encircled by the chromaticity values of the primary colors becomes the color reproduction area as described above. In order to expand the color reproduction area, it is considered suitable to increase the chroma of each primary color or to increase the number of primary colors. There has also been an attempt to realize a color reproduction area larger than that of the conventional three-primary color display, by using four primary colors as disclosed in the NHK technical material publication, NHK Broadcasting Technical Research, Tokyo, 1995. FIG. 13 and FIG. 14 show a color reproduction area in the XYZ space and a color reproduction area on an xy-chromaticity diagram of a four-primary color display respectively.

In the case of a multi-primary color display using N primary colors of four or more, X, Y and Z of colors displayed for signal values are obtained by the following expression as an expansion of the Expression (1).

$$\begin{pmatrix} X \\ Y \\ Z \end{pmatrix} = \begin{pmatrix} Xc1 & Xc2 & Xc3 & \cdots & XcN \\ Yc1 & Yc2 & Yc3 & \cdots & YcN \\ Zc1 & Zc2 & Zc3 & \cdots & ZcN \end{pmatrix} \begin{pmatrix} C1' \\ C2' \\ C3' \\ \vdots \\ CN' \end{pmatrix} \quad (3)$$

$C1'=\gamma_1(C1)$ $C2'=\gamma_2(C2)$ $C3'=\gamma_3(C3)$ $CN'=\gamma_N(CN)$

A conversion from X, Y and Z into signal values given as an inverse relationship of the Expression (3) is not determined uniquely except the surface of a color reproduction area of the multi-primary color display. Therefore, it is necessary to carry out a unique conversion of X, Y and Z into signal values based on some conditions. One example of a color conversion method in a multi-primary color display is disclosed in Jpn. Pat. Appln. KOKAI Publication No. 6-261332. According to a first example proposed in this publication, colors are reproduced based on a linear sum of three primary colors selected according to the chromaticity values of input colors. As a second example, there is disclosed a linear conversion using all the multi primary colors.

According to the color conversion method of the first example disclosed in Jpn. Pat. Appln. KOKAI Publication No. 6-261332, it is possible to carry out an accurate color reproduction in a range in which colors can be reproduced based on selected three primary colors. However, it is not possible to reproduce all the input colors as this method does not basically take into account a color reproduction area in a luminance direction of the multi-primary color display. Further, according to the color conversion method of the second example disclosed in Jpn. Pat. Appln. KOKAI Publication No. 6-261332, the method does not guarantee the obtaining of a solution in which all the primary-color signals are positive. Therefore, in some cases, reproducible input colors cannot be reproduced accurately.

It is desirable that a color conversion method makes it possible to carry out a colorimetrically accurate color reproduction. In other words, it is important that when input tristimulus values have been converted into color image signals and then the signals have been input to a display unit, the display unit can accurately display the input tristimulus values. It is desirable that the input tristimulus values and color image signal values change continuously. It is further desirable that these conditions are satisfied in all the color reproduction area of the display.

BRIEF SUMMARY OF THE INVENTION

It is, therefore, an object of the present invention to provide a color reproduction system capable of carrying out an accurate reproduction of colors in the whole color reproduction area.

In order to achieve the above object, according to a first aspect of the present invention, there is provided a color reproduction system comprising:

a color image display unit capable of displaying a color image of four or more primary colors; and a color converting unit for converting input three-primary color signals into color image signals of respective primary colors of the color image display unit, wherein the color converting unit includes:

an area deciding section for deciding a color conversion area to which the input three-primary color signals belong in a three-dimensional color space; and a color image signal calculating section for converting the input three-primary color signals into color image signals of respective primary colors based on color conversion parameters corresponding to a color conversion area decided by the area deciding section.

According to a second aspect of the invention, there is provided a color reproduction system comprising:

a color image display unit capable of displaying a color image of four or more primary colors; and a color converting unit for converting input three-primary color signals into color image signals of respective primary colors of the color image display unit, wherein the color converting unit includes:

a look-up table for outputting a table data corresponding to the input three-primary color signals;

an interpolation coefficient calculating section for calculating an interpolation coefficient corresponding to a data interval of the look-up table; and an interpolation calculating section for calculating an input signal to the color image display unit based on the table data and the interpolation coefficient.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 12 is a diagram showing a color reproduction area on an XY chromaticity diagram of a three-primary color display.

FIG. 13 is a diagram showing a color reproduction area in an XYZ space of a four-primary color display.

DETAILED DESCRIPTION OF THE INVENTION

Embodiments of the present invention will now be explained in detail with reference to the drawings.

(First Embodiment)

Figure 1:
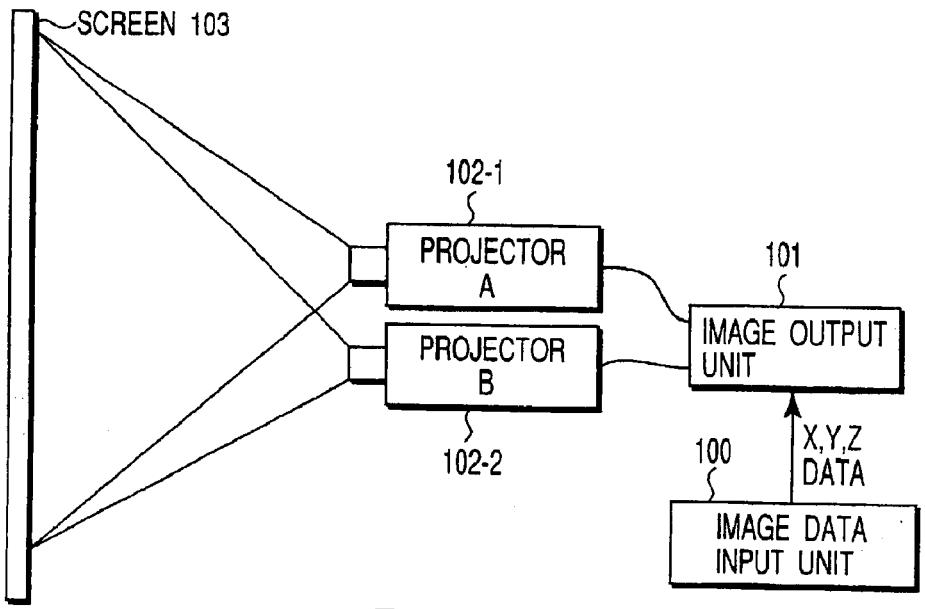
FIG. 1 is a diagram showing a schematic structure of a multi-primary color projector system as a color reproduction system relating to a first embodiment of the present invention.

FIG. 1 is a diagram showing a schematic structure of a multi-primary color projector system as a color reproduction system relating to a first embodiment of the present invention. An image data input unit 100 takes in color image data from a digital camera, a color scanner or the like. The image data input unit 100 converts this color image data into image data (input tristimulus values) consisting of X, Y and Z of the CIE1931 color display system for each pixel by using spectral sensitivity characteristics of the input unit that has taken the color image data and illumination data of the data input time. The image data input unit 100 then outputs the converted data to an image output unit 101.

The image output unit 101 converts the X, Y and Z data into input signals C1 and C2 to be applied to a projector A (102-1) and input signals C3 and C4 to be applied to a projector B (102-2), and outputs these signals to these corresponding projectors. The projector A (102-1) and the projector B (102-2) project images corresponding to the input signals C1, C2, C3 and C4 respectively onto a screen 103.

A color image of four primary colors reproduced by the projectors based on the image signals of C1, C2, C3 and C4 is displayed on the screen 103. The projector A (102-1) and the projector B (102-2) have the same structures except the spectra of primary colors to be projected onto the screen 103, and their structures are adjusted in advance so that positions of images projected onto the screen 103 accurately coincide with each other.

Figure 2:
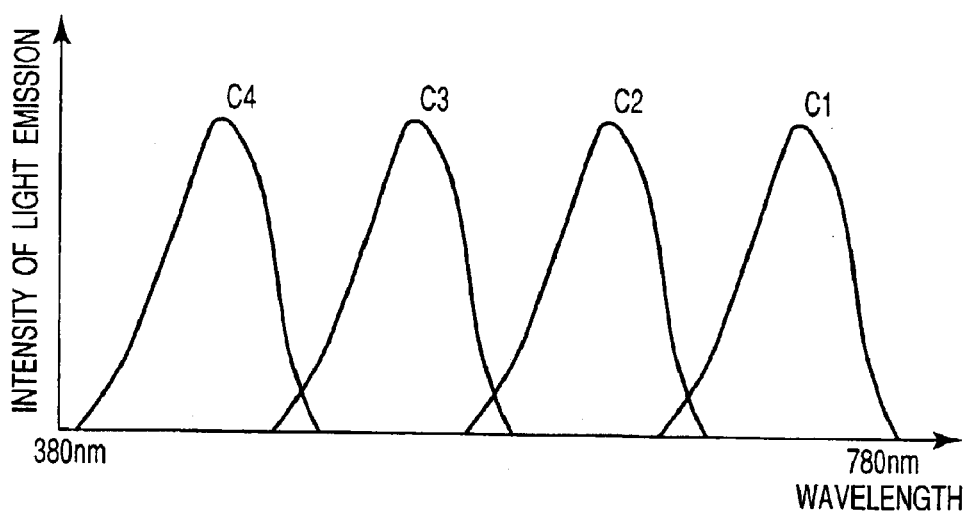
FIG. 2 is a diagram schematically showing light emission spectra of primary colors C1, C2, C3 and C4 of a projector A and a projector B.

FIG. 2 is a diagram schematically showing light emission spectra of the primary colors C1, C2, C3 and C4 of the projector A (102-1) and the projector B (102-2). The light emission spectra of the four primary colors are distributed over a wavelength area of a visible area from 380 nm to 780 nm.

Figure 3:
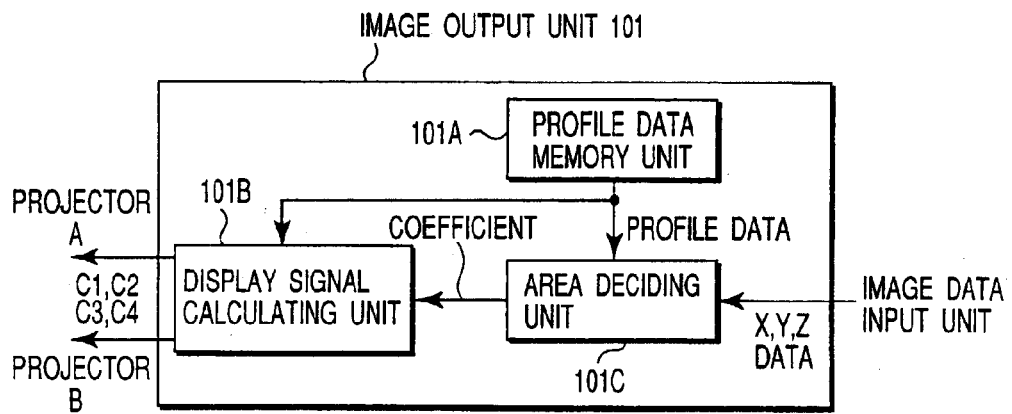
FIG. 3 is a diagram showing a structure of an image output unit 101.
Figure 4:
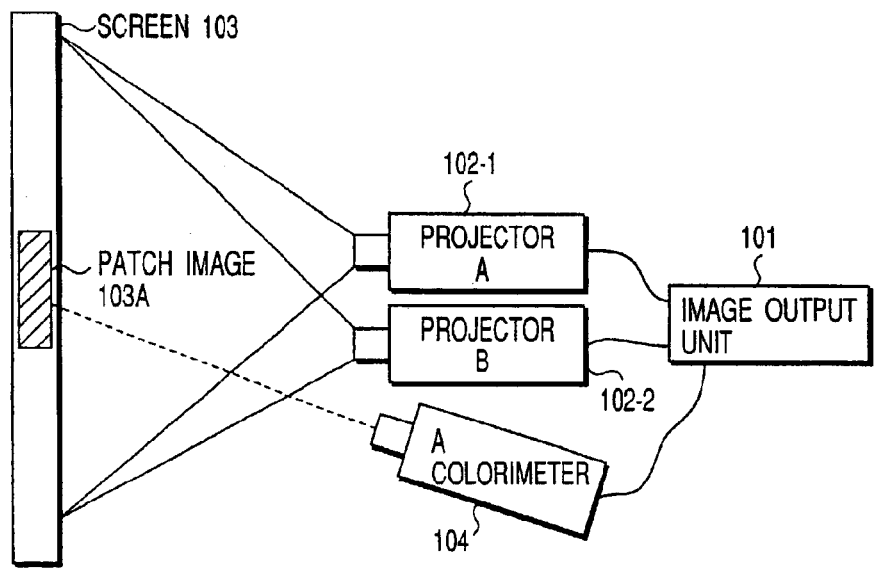
FIG. 4 is a diagram for explaining a method of generating a gradation characteristic data to be stored in a profile data memory unit 101A.

FIG. 3 is a diagram showing a structure of the image output unit 101. As shown in FIG. 3, the image output unit 101 consists of a profile data memory unit 101A for storing pre-measured profile data (color conversion parameters) of the projector A (102-1) and the projector B (102-2), an area deciding unit 101C for obtaining an area that prescribes conversion profiles of the input X, Y and Z data based on the profile data, and a display signal calculating unit 101B for converting coefficients of primary color signals, obtained as a result of the area decision, and the profile data into input signals to the projector A (102-1) and the projector B (102-2).

The profile data memory unit 101A stores the X, Y and Z data of primary colors at the time of a maximum light emission, and gradation characteristic data that gives a relationship between the input signal values and light-emission luminance, as profile data. These data are obtained by displaying a patch image 103A of a sample signal value for each primary color on the screen 103, and by measuring X, Y and Z values of each patch image by a spectrophotometer (or a calorimeter) 104 in synchronism with this display. The X, Y and Z values obtained as measured data are taken into the image output unit 101, and are then converted into data of a predetermined format by a profile data generating unit not shown within the image output unit 101. The data in the predetermined format is stored as the profile data in the profile data memory unit 101A.

A color reproduction area has been divided into a plurality of hexahedrons in advance. The area deciding unit 101C decides a divided area that includes the input X, Y and Z data from out of the divided areas. The area deciding unit 101C calculates a coefficient of a display signal from the X, Y and Z data and the profile data according to the divided area, and outputs the coefficient to the signal calculating unit 101B.

Figure 5:
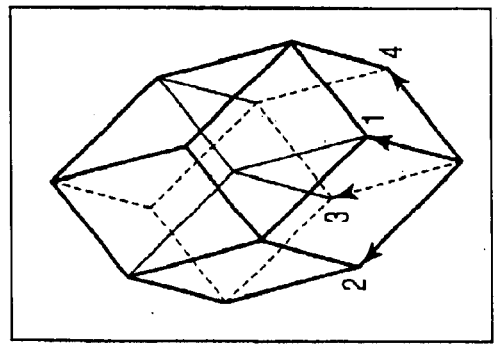
FIGS. 5A to 5E are diagrams for explaining a method of dividing a color reproduction area of a four-primary color display into four hexahedrons.

A decision of an area of the X, Y and Z data and a method of calculating a coefficient will be explained in detail with reference to FIG. 5A to FIG. 5E. First, a method of dividing a color reproduction area of the four-primary color display into four hexahedrons will be prescribed. A color reproduction area as shown in FIG. 5A is assumed in this case. Although there is no method of uniquely dividing a color reproduction area, the color reproduction area is divided into four hexahedrons as shown in FIG. 5B to FIG. 5E. In this example, the color reproduction area of the four-primary color display consists of a divided area 1 (FIG. 5B) that is prepared when a primary color 4 takes 0 and other three primary colors take 0 to a maximum value, a divided area 2 (FIG. 5C) that is prepared when a primary color 2 takes 0 and other three primary colors take 0 to a maximum value, a divided area 3 (FIG. 5D) that is prepared when a primary color 3 takes a maximum value and other three primary colors take 0 to a maximum value, and a divided area 4 (FIG. 5E) that is prepared when a primary color 1 takes a maximum value and other three primary colors take 0 to a maximum value.

In each divided area, three primary colors out of the four primary colors take a range of 0 to a maximum light emission, and the rest one primary color takes a constant value of either 0 or a maximum value. There are also other dividing methods that meet this condition, and it is possible to use any one of such dividing methods. A decision condition for deciding one of these divided areas in which the input X, Y and Z data are included is that coefficients $\alpha$, $\beta$ and $\gamma$ obtained from the following expression are $0 \leq \alpha, \beta, \gamma \leq 1$.

$$\begin{pmatrix} \alpha \\ \beta \\ \gamma \end{pmatrix} = \begin{pmatrix} X_1 & X_2 & X_3 \\ Y_1 & Y_2 & Y_3 \\ Z_1 & Z_2 & Z_3 \end{pmatrix}^{-1} \begin{pmatrix} X - X_0 \\ Y - Y_0 \\ Z - Z_0 \end{pmatrix} \quad (4)$$

In this case, $X_0$, $Y_0$ and $Z_0$ represent X, Y and Z of a constant-value primary color, that is, X, Y and Z of 0 or a maximum light emission as a constant-value primary color in a divided area. $X_1$, $Y_1$, $Z_1$, $X_2$, $Y_2$, $Z_2$, and $X_3$, $Y_3$, $Z_3$ represent X, Y and Z of a maximum light emission of first, second and third primary colors in a divided area respectively. Based on the above condition, a decision is made for each constant-value primary color and first to third primary colors that are different by divided areas. When a decision has been made that the X, Y and Z data are included in one divided area, the coefficients α, β and γ and a constant value 0 or 1 are output to the display signal calculating unit 101B in a predetermined order of primary colors.

When the X, Y and Z data are not included in any one of the divided areas, that is, when the X, Y and Z data are outside the color reproduction area, predetermined X, Y and Z in the color reproduction area are used as a target color. Then, the X, Y and Z data are mapped into a cross point between a line connecting between the X, Y and Z data and the target color and the surface of the color reproduction area. A coefficient of a display signal of the mapped data is output to the display signal calculating unit 101B.

Figure 6:
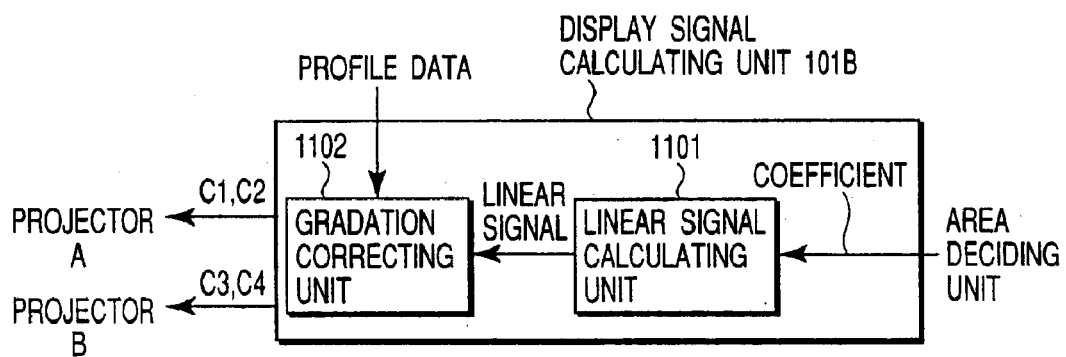
FIG. 6 is a diagram showing a structure of a display-signal calculating unit 101B.

The display signal calculating unit 101B consists of a linear signal calculating unit 1101 and a gradation correcting unit 1102 as shown in FIG. 6. The linear signal calculating unit 1101 multiplies a maximum gradation value of each primary color to a corresponding coefficient that has been input from the area deciding unit 101C, thereby to obtain a linear signal. The gradation correcting unit 1102 corrects a gradation of each linear signal (Q1, Q2, Q3 and Q4) that has been input from the linear signal calculating unit 1101, and outputs the input signals (C1, C2, C3 and C4) to the projector A (102-1) and the projector B (102-2). The gradation correction is obtained from the following expression by using an inverse relation $\gamma^{-1}$ of gradation characteristic data that gives output luminance to the input signal.

$$C1 = \gamma_1^{-1}(Q1)$$
$$C2 = \gamma_2^{-1}(Q2)$$
$$C3 = \gamma_3^{-1}(Q3)$$
$$C4 = \gamma_4^{-1}(Q4) \qquad (5)$$

The gradation characteristic data used here is input from the profile data memory unit 101A to the gradation correcting unit 1102. The above processing for obtaining a display signal from the X, Y and Z data is carried out for each pixel, and the input signals (C1, C2, C3 and C4) are input to the projector A (102-1) and the projector B (102-2).

It is possible to achieve a colorimetrically accurate color reproduction over the whole area of color reproduction in the manner as described above.

(Second Embodiment)

Figure 7:
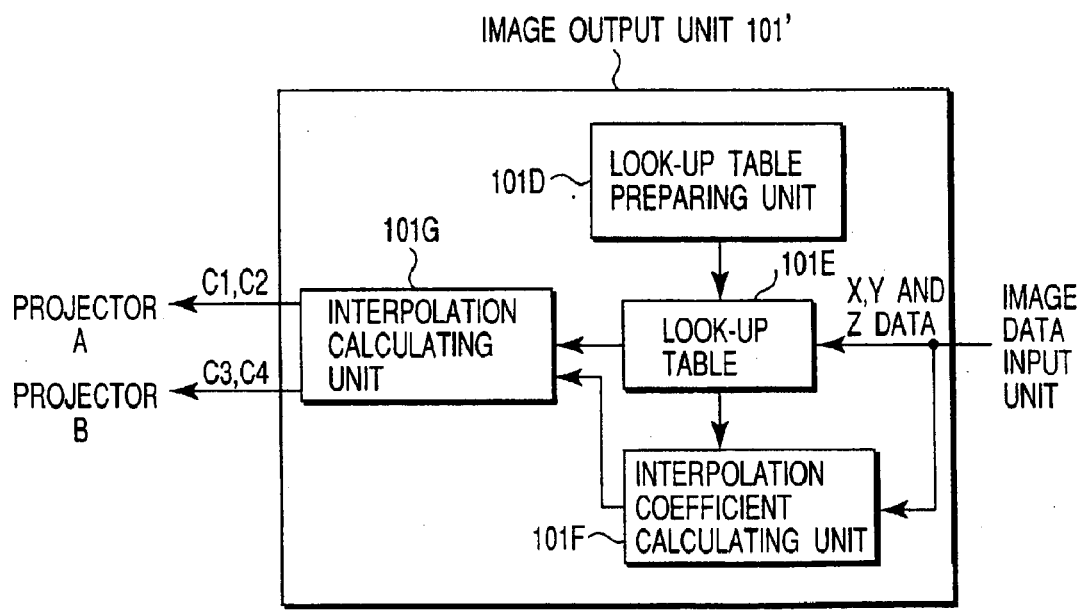
FIG. 7 is a diagram showing a structure of an image output unit relating to a second embodiment of the present invention.

A second embodiment of a color reproduction system according to the present invention will be explained. Structures other than that of the image output unit are similar to those of the first embodiment, and their explanation will be omitted. An image output unit 101' of the second embodiment consists of a look-up table preparing unit 101D, a look-up table 101E, an interpolation coefficient calculating unit 101F, and an interpolation calculating unit 101G, as shown in FIG. 7. X, Y and Z data supplied from an image data input unit 100 are input to the look-up table 101E and to the interpolation coefficient calculating unit 101F.

The look-up table 101E outputs table data corresponding to the X, Y and Z data that have been input to the interpolation calculating unit 101G. The interpolation coefficient calculating unit 101F calculates an interpolation coefficient corresponding to a data interval of data from the look-up table 101E by using the input X, Y and Z data, and outputs the calculated coefficient to the interpolation calculating unit 101G.

The interpolation calculating unit 101G calculates the input signals C1, C2, C3 and C4 to the projector A (102-1) and the projector B (102-2), from the table data according to the X, Y and Z data and the interpolation coefficient. The interpolation calculating unit 101G outputs the calculated input signals to the projector A (102-1) and the projector B (102-2). The data inside the look-up table 101E has been calculated in advance by the look-up table preparing unit 101D.

Figure 8:
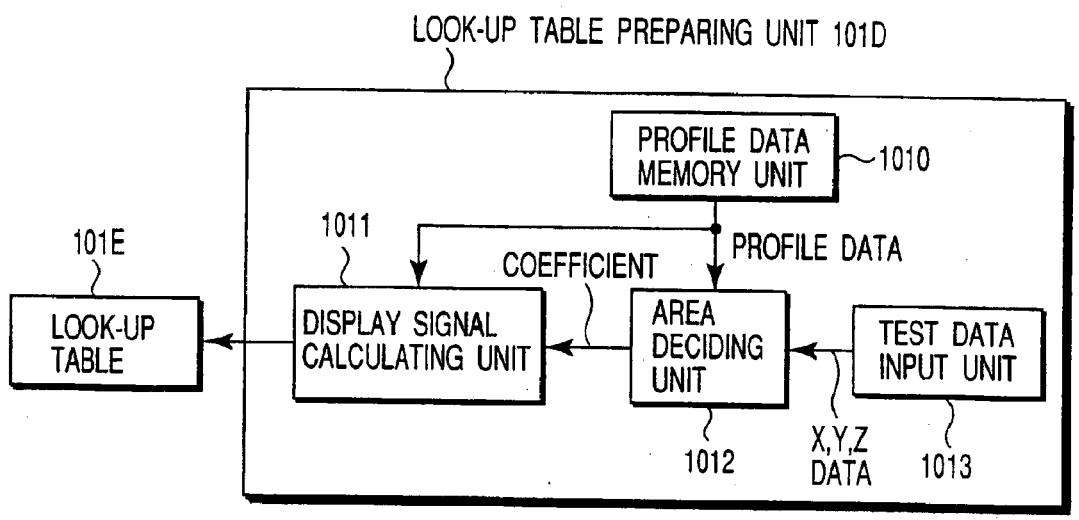
FIG. 8 is a diagram showing a structure of a look-up table 101D shown in FIG. 7.

A function of each unit within the image output unit 101' will be explained in detail. The look-up table preparing unit 101D consists of a profile data memory unit 1010, a test data input unit 1013, an area deciding unit 1012, and a display signal calculating unit 1011, as shown in FIG. 8. The test data input unit 1013 calculates X, Y and Z data of a predetermined interval to be transmitted to the look-up table 101E, and sequentially inputs the X, Y and Z data to the area deciding unit 1012.

The area deciding unit 1012 decides an area based on the X, Y and Z data that have been input from the test data input unit 1013, calculates a coefficient of a primary-color signal, and outputs the coefficient to the display signal calculating unit 1011. A method of calculating a coefficient is similar to that explained in the first embodiment, and the explanation thereof will be omitted. When a decision has been made that the input X, Y and Z data are outside of all the areas, that is, when the input X, Y and Z data are outside the color reproduction area of the projector A (102-1) and the projector B (102-2), a color gamut compression is carried out to map the X, Y and Z data into colors that can be reproduced by the projector A (102-1) and the projector B (102-2).

Based on the color gamut compression, the X, Y and Z data are replaced by a color at the cross point between the color gamut surface and the line connecting between a target point within the color gamut and the input X, Y and Z in the projector A (102-1) and the projector B (102-2).

Figure 9:
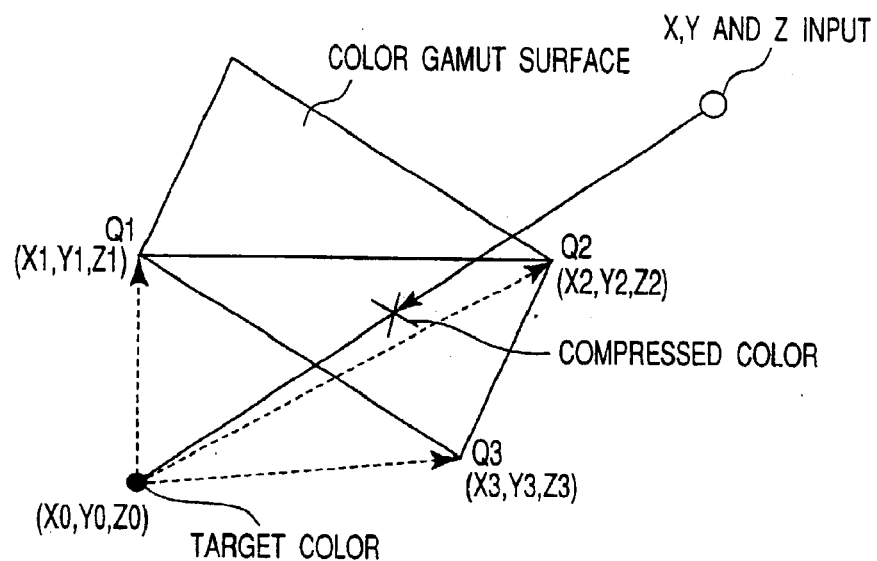
FIG. 9 is a conceptional diagram of a color-gamut compression.

FIG. 9 is a conceptional diagram of a color-gamut compression. A color gamut surface is divided into triangles. Tristimulus values at three vertexes of a triangle are expressed as $(X_1, Y_1, Z_1)$ $(X_2, Y_2, Z_2)$ and $(X_3, Y_3, Z_3)$, tristimulus values of a target color are expressed as $(X_0, Y_0, Z_0)$, and an input color is expressed as $(X, Y, Z)$.

$$\begin{pmatrix} K1 \\ K2 \\ K2 \end{pmatrix} = \begin{pmatrix} X_1 - X_0 & X_2 - X_0 & X_3 - X_0 \\ Y_1 - Y_0 & Y_2 - Y_0 & Y_3 - Y_0 \\ Z_1 - Z_0 & Z_2 - Z_0 & Z_3 - Z_0 \end{pmatrix}^{-1} \begin{pmatrix} X - X_0 \\ Y - Y_0 \\ Z - Z_0 \end{pmatrix} \qquad (6)$$

When k1, k2 and k3 calculated by the Expression (6) meet $k1 \geq 0$, $k2 \geq 0$ and $k3 \geq 0$, then coefficients d1 to d4 are calculated from the following Expression (7).

$$\begin{pmatrix} d1 \\ d2 \\ d3 \\ d4 \end{pmatrix} = \begin{pmatrix} p11 & p12 & p13 \\ p21 & p22 & p23 \\ p31 & p32 & p33 \\ p41 & p42 & p43 \end{pmatrix} \begin{pmatrix} K1/(K1+K2+K3) \\ K2/(K1+K2+K3) \\ K3/(K1+K2+K3) \end{pmatrix} \qquad (7)$$

A result of the calculation of the coefficients is input to the display signal calculating unit 1011. Pji represents a j-th signal value coefficient.

The display signal calculating unit 1011 calculates signals to be input to the projector A (102-1) and the projector B (102-2) based on the coefficients of signal values that have been input from the area deciding unit 1012 and the profile data that has been input from the profile data memory unit 1010. The display signal calculating unit 1011 inputs the calculated input signals to the look-up table 101E.

The display signal calculating unit 1011 is similar to that explained in the first embodiment, and the explanation thereof will be omitted here. The above processing is carried out for X, Y and Z of all the addresses of the look-up table.

In order to convert the X, Y and Z data that have been input from the image data input unit 100 into signals to be input to the projectors, sample display signals ($C^{(j)}1, C^{(j)}2, C^{(j)}3, C^{(j)}4$) (j=1 to 8) corresponding to eight samples of X, Y and Z that surround the input X, Y and Z data are input to the interpolation calculating unit 101G from the look-up table 101E. The interpolation coefficient calculating unit 101F calculates an interpolation coefficient $k^{(j)}$ (j=1 to 8) form the X, Y and Z data and a sample interval of samples from the look-up table 101E.

The interpolation calculating unit 101G calculates from the following expression the signals (C1, C2, C3, C4) to be input to the projector A (102-1) and the projector B (102-2) based on the sample display signals ($C^{(j)}1, C^{(j)}2, C^{(j)}3, C^{(j)}4$) (j=1 to 8) and the interpolation coefficient $k^{(j)}$ (j=1 to 8).

$$Ci = \sum_{j=1}^{8} K^{(j)} C^{(j)} i \qquad (8)$$

In the above expression, i=1 to 4. The above processing of obtaining a display signal from X, Y and Z is carried out for each pixel, and the input signals (C1, C2, C3, C4) are input to the projector A (102-1) and the projector B (102-2).

It is possible to achieve a colorimetrically accurate color reproduction over the whole area of color reproduction in the manner as described above.

(Third Embodiment)

A third embodiment of a color reproduction system according to the present invention will be explained. In the third embodiment, operation of the image output unit is similar to that of the image output unit 101 explained in the first embodiment except the processing of the area deciding unit 101C and the display signal calculating unit 101B. Therefore, the explanation of the similar units will be omitted here.

In the third embodiment, a color reproduction area has been divided into a plurality of tetrahedrons in advance. An area deciding unit decides an area that includes input X, Y and Z data from out of all the divided areas. The area deciding unit calculates a linear signal from the X, Y and Z data and the profile data corresponding to the divided area, and outputs the calculated signal to a display signal calculating unit of the third embodiment. A display signal calculating unit corrects the gradation of the linear signal and calculates a display signal.

An area decision for the X, Y and Z data and a method of calculating a display signal will be explained in detail. First, a color reproduction area of a four-primary color display is divided into tetrahedrons by the number of planes that constitute a surface of the color reproduction area. It is assumed that a tetrahedron is an area encircled by planes that constitute a surface of a color reproduction area and a predetermined target color. The target color is prescribed as X, Y and Z corresponding to a predetermined color image signal. A decision condition for deciding one of the divided areas in which the X, Y and Z data are included is that coefficients $\alpha$, $\beta$ and $\gamma$ obtained from the following expression are $0 \leq \alpha, \beta, \gamma \leq 1$.

$$\begin{pmatrix} \alpha \\ \beta \\ \gamma \end{pmatrix} = \begin{pmatrix} X_1 - X_0 & X_2 - X_0 & X_3 - X_0 \\ Y_1 - Y_0 & Y_2 - Y_0 & Y_3 - Y_0 \\ Z_1 - Z_0 & Z_2 - Z_0 & Z_3 - Z_0 \end{pmatrix}^{-1} \begin{pmatrix} X - X_0 \\ Y - Y_0 \\ Z - Z_0 \end{pmatrix} \qquad (9)$$

It is assumed that colors outside the color reproduction area are also converted by using the same matrix. Accordingly, linear signals Q1 to Q4 are calculated from the following expression when the coefficients $\alpha$, $\beta$ and $\gamma$ meet $0 \leq \alpha, \beta, \gamma$.

$$\begin{pmatrix} Q1 \\ Q2 \\ Q3 \\ Q4 \end{pmatrix} = \begin{pmatrix} Q11 - Q01 & Q12 - Q01 & Q13 - Q01 \\ Q21 - Q02 & Q22 - Q02 & Q23 - Q02 \\ Q31 - Q03 & Q32 - Q03 & Q33 - Q03 \\ Q41 - Q04 & Q42 - Q04 & Q43 - Q04 \end{pmatrix} \begin{pmatrix} \alpha \\ \beta \\ \gamma \end{pmatrix} + \begin{pmatrix} Q01 \\ Q02 \\ Q03 \\ Q04 \end{pmatrix} \qquad (10)$$

In this case, Qij represents a j-th linear signal of an i-th vertex. When the linear signal is negative, the signal is clipped to 0. And when the liner signal is larger than a maximum signal value, the signal is clipped to a maximum value. The linear signal that has been calculated by the area deciding unit is input to the display signal calculating unit. The display signal calculating unit corrects the gradation and calculates a display signal. The above processing for obtaining a display signal from the X, Y and Z data is carried out for each pixel, and the display signals (C1, C2, C3 and C4) are input to the projector A (102-1) and the projector B (102-2).

It is possible to achieve a colorimetrically accurate color reproduction over the whole area of color reproduction in the manner as described above.

Figure 10:
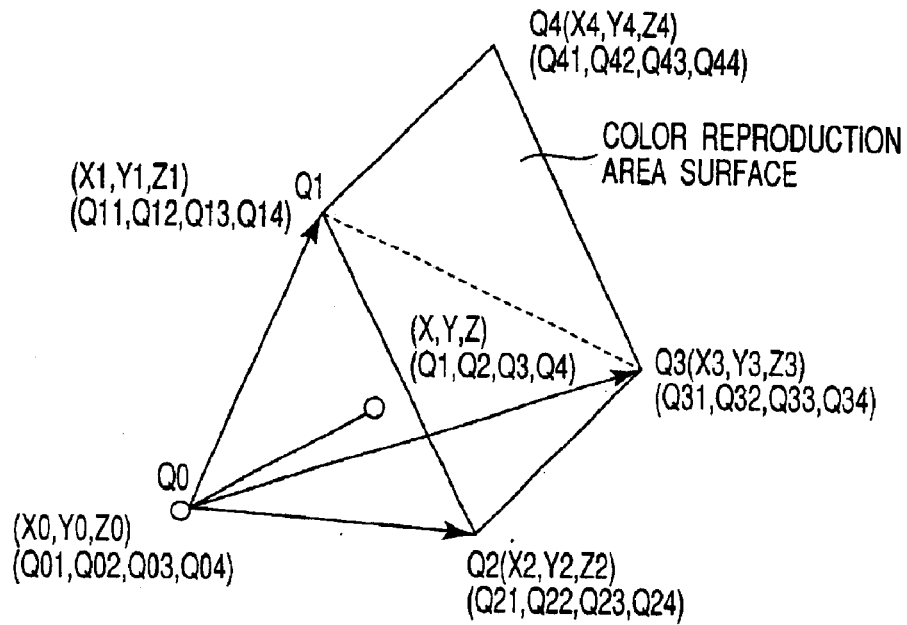
FIG. 10 is a diagram for explaining a method of dividing a color reproduction area of a four-primary color display.
Figure 11:
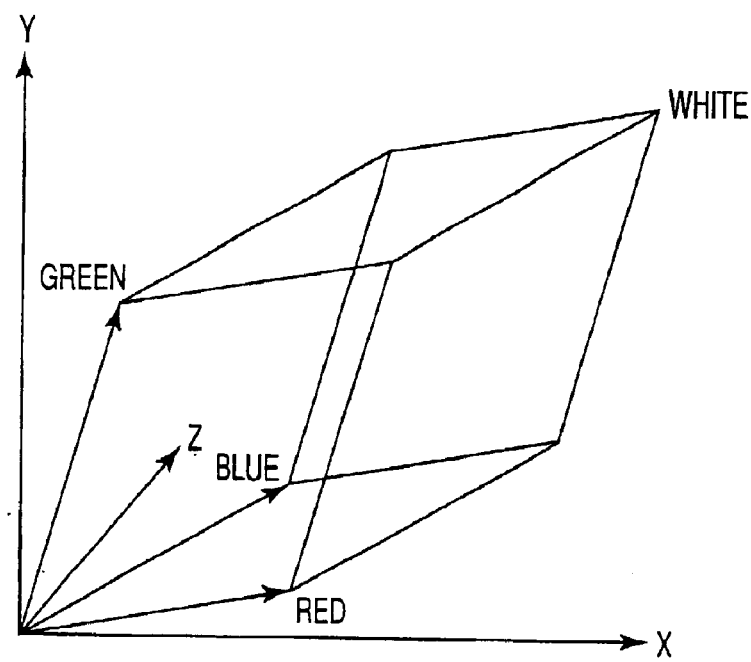
FIG. 11 is a schematic diagram of a color reproduction area in an XYZ space of a three-primary color display.
Figure 14:
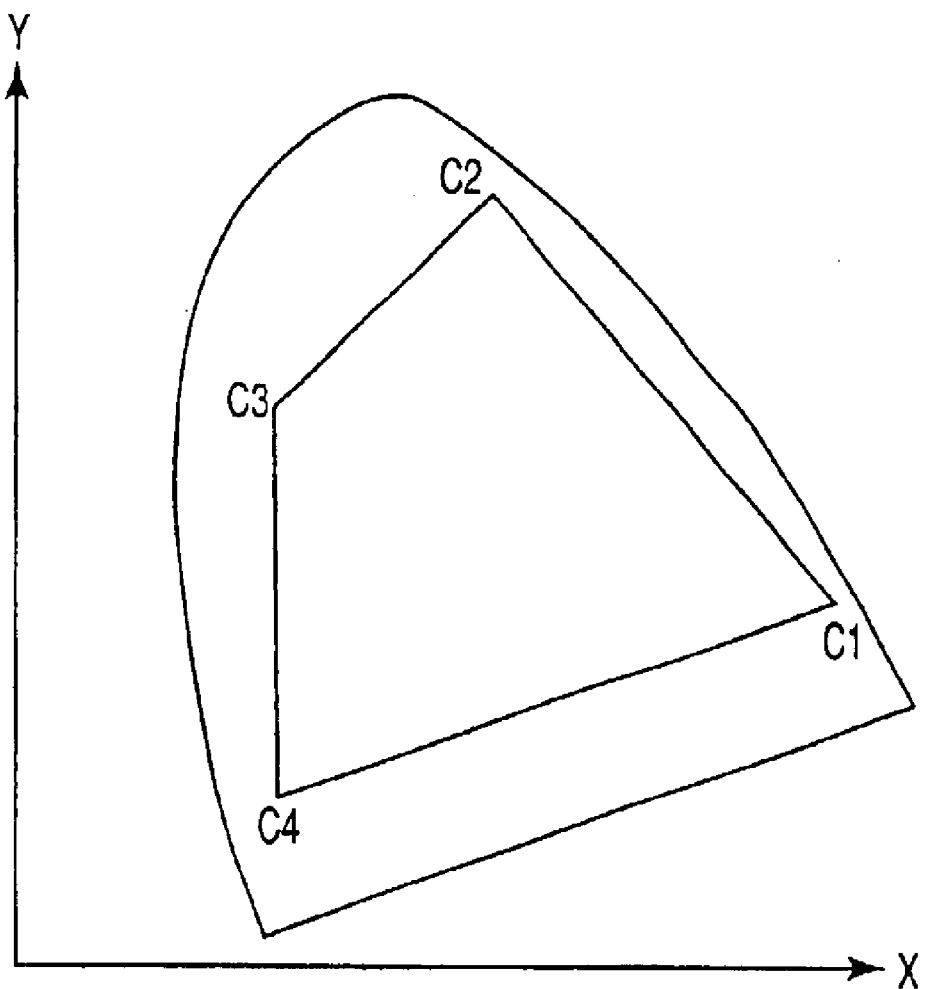
FIG. 14 is a diagram showing a color reproduction area on an XY chromaticity diagram of a four-primary color display.

In the present embodiment, the processing of colors within a triangular pyramid Q0, Q1, Q2, Q3 shown in FIG. 10 has been explained. However, as a triangular pyramid Q0, Q1, Q3, Q4 also has the same matrix, it is also possible to use a quadrangular pyramid Q0, Q1, Q2, Q3, Q4 as one divided area. In this case, twelve divided areas construct a four-primary color display.

From the above detailed embodiments, inventions of the following constructions can be drawn.

Construction 1

A color reproduction system comprising:

a color image display means having four or more primary colors; and a color converting means for converting input tristimulus values into color image signals of respective primary colors of the color image display unit, wherein the color converting means includes:

an area deciding means for deciding a color conversion area to which the input tristimulus values belong in a three-dimensional color space; and a color image signal calculating means for converting the input tristimulus values into color image signals based on color conversion parameters corresponding to a color conversion area decided by the area deciding unit.

Construction 2

A color reproduction system according to the above construction 1, wherein the color conversion area corresponding to the input tristimulus values within a color gamut of the color image display unit is a hexahedron constructed by colors corresponding to three color image signals that take a value from 0 to a maximum value and other color image signals that take either 0 or a maximum value.

(Corresponding Embodiments of the Invention)

The inventions described in the constructions 1 and 2 correspond to at least the above first embodiment (FIG. 1 to FIG. 6). The color image display unit corresponds to the projectors A (102-1) and B (102-2) and the screen 103, the color converting unit corresponds to the image output unit 101, the area deciding unit corresponds to the area deciding unit 101C, the color conversion parameters correspond to the profile data, and the color image signal calculating unit corresponds to the display signal calculating unit 101B.

Although projectors have been taken as an example of the color image display unit in the first embodiment, the display unit is not limited to this application. It is also possible to apply the color image display to any other optional display that is based on the additive color mixture of primary color lights as the principle of color reproduction such as a CRT display, a liquid crystal display, etc. Further, although a four-primary color display has been explained as an example, the number of primary colors is not limited to four, and the display can be applied to any display having optional N primary colors. Although four primary colors have been realized by using two projectors in the first embodiment, it is also possible to use one projector that can display four primary colors. Although X, Y and Z data have been used for input to the image output unit, it is also possible to use R, G and B data that are in a known linear relationship with X, Y and Z. In this case, data corrected based on the relationship between X, Y, Z and R, G, B are used in the image output unit.

(Effects)

According to the construction 1 or 2, it is possible to provide a color reproduction system capable of achieving an accurate color reproduction over the whole color reproduction area. Further, the input tristimulus values and the color image signal values change continuously, and these conditions are met over the whole color reproduction area of the display.

Construction 3

A color reproduction system according to the construction 1, wherein the color conversion area is a pyramid constructed by predetermined tristimulus values and vertexes that form a color gamut surface within a color gamut of the color image display unit.

(Corresponding Embodiments of the Invention)

The invention described in the construction 3 corresponds to at least the above third embodiment (FIG. 10). The color image display unit corresponds to the projectors A (102-1) and B (102-2) and the screen 103, the color converting unit corresponds to the image output unit 101, the area deciding unit corresponds to the area deciding unit 101C, the color conversion parameters correspond to the profile data, and the color image signal calculating unit corresponds to the display signal calculating unit 101B.

Although projectors have been taken as an example of the color image display unit in the third embodiment, the display unit is not limited to this application. It is also possible to apply the color image display to any other optional display that is based on the additive color mixture of primary color lights as the principle of color reproduction such as a CRT display, a liquid crystal display, etc. Further, although a four-primary color display has been explained as an example, the number of primary colors is not limited to four, and the display can be applied to any display having optional N primary colors.

Although four primary colors have been realized by using two projectors in the third embodiment, it is also possible to use one projector that can display four primary colors. Although X, Y and Z data have been used for input to the image output unit, it is also possible to use R, G and B data that are in a known linear relationship with X, Y and Z. In this case, data corrected based on the relationship between X, Y, Z and R, G, B are used in the image output unit.

(Effects)

According to the construction 3, it is possible to provide a color reproduction system capable of achieving an accurate color reproduction over the whole color reproduction area. Further, the input tristimulus values and the color image signal values change continuously, and these conditions are met over the whole color reproduction area of the display. It is also possible to map colors outside the color reproduction area by using the matrix within the color reproduction area.

Construction 4

A color reproduction system according to any one of the constructions 1 to 3, wherein the color image signal calculating unit comprises a look-up table for storing the color image signals by using the input tristimulus values as an address, and a color converting unit for converting the input tristimulus values into color image signals by referring to the look-up table.

(Corresponding Embodiments of the Invention)

The invention described in the construction 4 corresponds to at least the above second embodiment (FIG. 7 to FIG. 9). The color image display unit corresponds to the projectors A (102-1) and B (102-2) and the screen 103, the color converting unit corresponds to the image output unit 101', the area deciding unit corresponds to the area deciding unit 1012, the color conversion parameters correspond to the profile data, and the color image signal calculating unit corresponds to the display signal calculating unit 1022.

Although projectors have been taken as an example of the color image display unit in the second embodiment, the display unit is not limited to this application. It is also possible to apply the color image display to any other optional display that is based on the additive color mixture of primary color lights as the principle of color reproduction such as a CRT display, a liquid crystal display and the like. Further, although a four-primary color display has been explained as an example, the number of primary colors is not limited to four, and the display can be applied to any display having optional N primary colors. Although four primary colors have been realized by using two projectors in the second embodiment, it is also possible to use one projector that can display four primary colors. The number of samples of the look-up table is optional, and it is possible to avoid an interpolation calculation by having look-up table data by the number of the input X, Y and Z data. Although an eight-point interpolation has been explained in the present embodiment, it is also possible to use other interpolation method such as a four-point interpolation. Although X, Y and Z data have been used for input to the image output unit, it is also possible to use R, G and B data that are in a known linear relationship with X, Y and Z. In this case, data corrected based on the relationship between X, Y, Z and R, G, B are used in the image output unit.

(Effects)

According to the construction 4, the look-up table stores a result of a color conversion having input tristimulus values as an address, and a color conversion is carried out by referring to the look-up table. Therefore, in addition to the effects of the constructions 1 and 3, there is also an effect that it is possible to obtain an output signal at a high speed. It is possible to store a conversion result in the look-up table in advance. Therefore, there is also an effect that it is possible to carry out a color gamut compression for colors outside the color reproduction area that requires more calculation time.

According to the present invention, it is possible to provide a color reproduction system that can achieve an accurate color reproduction in the whole color-reproduction area.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color reproduction system comprising:
a color image display unit capable of displaying a color image of at least four primary colors; and
a color converting unit for converting input three color values which are associated with tristimulus values into color image signals of respective primary colors of the color image display unit,
wherein the color converting unit includes:
an area deciding section for deciding which one of a plurality of color conversion areas the input three color values belong to in a three-dimensional color space; and
a color image signal calculating section for converting the input three color values into the color image signals of the respective primary colors based on color conversion parameters corresponding to the color conversion area decided by the area deciding section, and
wherein the color converting unit obtains a color image signal that is larger than 0 for at least four primary colors in at least one of the color conversion areas.

2. A color reproduction system according to claim 1, wherein the decided color conversion area is a hexahedron constructed by colors corresponding to three color image signals that take a value from 0 to a maximum value and other color image signals that take one of 0 and the maximum value.

3. A color reproduction system according to claim 1, wherein the decided color conversion area is a pyramid constructed by predetermined input tristimulus values within a reproducible color space in the color image display unit and vertexes that form a surface of the reproducible color space.

4. A color reproduction system according to claim 1, wherein the color image signal calculating section comprises a look-up table for storing the color image signals by using the input tristimulus values as an address, and a color converting unit for converting the input tristimulus values into color image signals by referring to the look-up table.

5. A color reproduction system according to claim 1, wherein the color converting unit further includes a profile data memory section for storing profile data of the color image display unit as the color conversion parameters, the area deciding section obtains an area for prescribing a conversion profile of the input tristimulus values by using the profile data and outputs a coefficient of each primary color signal according to the area, and the color image signal calculating section converts the coefficient of each primary color signal and the profile data into an input signal to the color image display unit.

6. A color reproduction system according to claim 5, wherein the profile data memory section stores X, Y and Z coordinate data at a time of a maximum light emission of each primary color and gradation characteristic data for providing a relationship between an input signal value and light emission luminance as the profile data.

7. A color reproduction system according to claim 5, wherein the profile data is prepared by displaying an image of a sample signal value for each primary color in the color image display unit and by measuring X, Y and Z values of the images in synchronism with the display of the image of the sample signal value for each primary color.

8. A color reproduction system according to claim 1, wherein the area deciding section divides a reproducible color space in the color image display unit into a plurality of divided areas based on a combination of three color image signals that take a value from 0 to a maximum value and other color image signals that take either 0 or a maximum value, determines a divided area to which the input tristimulus values belong among the plurality of divided areas, and outputs a coefficient of each primary color signal in the determined divided area.

9. A color reproduction system according to claim 8, wherein each of the plurality of divided areas is a hexahedron.

10. A color reproduction system according to claim 8, wherein when the input tristimulus values do not belong to any one of the plurality of divided areas, the area deciding section sets a predetermined position within the reproducible color space in the color image display unit as a target color, maps the input tristimulus values into a cross point between a line connecting between the target color and the input tristimulus values and the surface of the reproducible color space, and outputs a coefficient of each primary color signal.

11. A color reproduction system according to claim 5, wherein the color image signal calculating section comprises a linear signal calculating section for obtaining a linear signal by multiplying a maximum gradation value of each primary color to a corresponding coefficient from the area deciding section and outputting the obtained linear signal, and a gradation correction section for correcting a gradation of each linear signal by using gradation characteristic data from the profile memory unit.

12. A color reproduction system according to claim 1, wherein:
the area deciding section decides a divided area for converting the input tristimulus values from a reproducible color space that has been divided into a plurality of tetrahedral areas in advance, and calculates a linear signal based on the input tristimulus values and the profile data according to the decided divided area, and
the color image signal calculating section carries out a predetermined gradation correction and calculates an input signal to the color image display unit.

13. A color reproduction system according to claim 1, wherein at least one of the color conversion areas is a polyhedron which includes a tristimulus value that is obtained by mixing at least four primary colors, as a vertex.

14. A color reproduction system according to claim 13, wherein at least one of the color conversion areas is one of a hexahedron and a pyramid which includes a tristimulus value that is obtained by mixing at least four primary colors, as a vertex.

15. A color reproduction system according to claim 1, wherein said color image display unit includes a plurality of color image display devices each corresponding to a different one of three main primary colors.

* * * * *